United States Patent [19]
Anderson

[11] Patent Number: 4,555,619
[45] Date of Patent: Nov. 26, 1985

[54] DRIVER KEY CAR IDENTIFYING SYSTEM

[75] Inventor: Eric G. Anderson, Rochester, Mich.

[73] Assignee: Rockwell International Corporation, Pittsburgh, Pa.

[21] Appl. No.: 496,043

[22] Filed: May 19, 1983

[51] Int. Cl.[4] .......................................... G06K 19/06
[52] U.S. Cl. .................................. 235/492; 235/482; 235/487
[58] Field of Search ........................................ 235/492

[56] References Cited

U.S. PATENT DOCUMENTS

| | | | |
|---|---|---|---|
| 3,609,880 | 10/1971 | Arbon | 235/482 |
| 3,702,464 | 11/1972 | Castrucci | 235/492 |
| 3,831,119 | 8/1974 | Ambrosio | 235/492 |
| 3,851,314 | 11/1974 | Hedin | 235/492 |
| 3,928,750 | 12/1975 | Wolflingseder | 235/492 |
| 3,934,122 | 1/1976 | Riccitelli | 235/492 |

Primary Examiner—Harold I. Pitts

[57] ABSTRACT

A key card receiver is mounted in the cab of a truck. The driver inserts a card with a power-in contact shorted to several data output contacts. A power-out contact provides power to the receiver to operate three sequentially connected integrated circuits and another integrated circuit for pulsing the three serially connected circuits to convert concurrent binary data of shorted or open conductors on the driver card to a sequential data signal.

15 Claims, 7 Drawing Figures

DRIVER KEY CAR IDENTIFYING SYSTEM

BACKGROUND OF THE INVENTION

Card identifying systems are well known. The system may be expensive and bulky and require either complex cards or complex components.

Conventional systems are unsuited for use in identifying operators of heavy equipment because their readers or the cards themselves are unsuited for the environment of heavy vibrations and rough usage.

SUMMARY OF THE INVENTION

The present system overcomes problems existing in prior art systems.

A rugged, simple body constructed of three parts made on two die castings is mounted within a cab of a truck. Assembling two of the body parts locks a card-reading jack in the body, and the card reading circuit which is connected to the jack is positioned within a small chamber in the body.

The electronic circuit within the chamber is powered only by inserting an appropriate card within the jack between widely spaced power-in and power-out terminals. Thus, the system is reliable because there is no power supplied to the circuit in the absence of the fully inserted card. Since the card supplies the circuit completion, there are no mechanical switches which often are the weakest points in a system. The electronic components are simply constructed of three serially interconnected integrated circuits and a fourth integrated circuit which pulses the serial circuits with four capacitors to isolating breakdown diodes and four resistors in addition to the resistor specifically connected to the data lines. A simple, compact rugged system results.

The system employs a driver identification card which is rugged and simply designed and which is easily and accurately coded and which is constructed of readily available parts. The entire system, including the receiver, the reader and the card, is rugged and uncomplicated and inexpensive.

A preferred key card system includes a key card with multiple data contacts and power-in contacts and power-out contacts, connection means for connecting the power-in contacts with the power-out contact, plural conductors connecting the power-in contacts to the data contacts and means for interrupting selected conductors for producing a binary code of shorted and interrupted conductors on the contacts. A key card receiver has a jack with plural terminals including power-in terminals and power-out terminals and data terminals, respectively for connection to power-in, power-out and data contacts of the key card. A power source is connected to the power-out terminal. Converting means are connected to the data terminals for converting binary shorted or open data from the key card concurrently received on the data terminals to sequential data. Signal output means is connected to the converting means for carrying the sequential data to a remote location.

In a preferred embodiment, the key card has first and second sides. Power-in contacts and power-out contacts are positioned on both sides and are connected to each other through a body of the card. The data contacts and conductors also are positioned on opposite sides of the card. The conductors are connected to each other by connectors extending through the card from the first side to the second side. Preferably conductors on one side of the card are alternately looped for permitting connectors extending through the card to connect ends of the conductors remote from the contacts to conductors on opposite sides of the card which are connected to contacts in opposite sequential order. Thereby the card may be inserted in the receiver with either side up. The conductors on the opposite side of the card are connected to each other and are connected to the power-in and power-out contacts. Preferably, portions of the conductors on the opposite side of the card are widely spaced on the card for selective interrupting. Bus conductors extend longitudinally on the card from the power-in and power-out terminals. The contacts on the opposite sides of the card are connected to the bus terminals with conductors having widely spaced portions for selective interrupting. The receiver includes a housing having upper and lower halves and a card receiver insert fixed in at least one half of the housing. A jack is fixed internally within the housing between the insert and the housing.

Preferably a power-in line is mounted parallel to the signal output line. A power bus is mounted in the receiver and is connected to the power-in terminal. The preferred converting means has plural integrated circuits connected to the power bus, connected to the data input terminals and connected to the signal output line. Preferably, the plural integrated circuits are sequentially connected to each other then to the signal output line for converting concurrent binary input signals to a pulsed output train. Clock means connected to the power bus and connected to the plural integrated circuits pulse the integrated circuits to control the flow of sequential data among the integrated circuits and from the plural integrated circuits to the signal output line.

A preferred driver identification system includes a driver card receiver and means for mounting the driver card receiver in a cab of a vehicle. The driver card receiver has a jack with plural data input terminals and with a power-out terminal and power-in terminal for receiving a driver card with data contacts and power-in and power-out contacts. Signal converting means in the receiver for converting concurrent data signals from the jack terminals to sequential signals. Signal output means carry sequential signals out of the receiver. Power means mounted in the receiver for supply power to the power-out terminals. The system further includes a driver identification card. A dielectric card has a size which permits the card to be inserted in the receiver and has an end for inserting in the jack. The end has data contacts complementary to data terminals in the jack and has power-in and power-out contacts complementary to power-out and power-in terminals, respectively in the jack. The driver receiver card has conductors on opposite sides of the card. Conductors on one side of the card are connected to either the power-in terminals or the power-out terminals. Conductors on another side of the card terminate in connectors which extend through the card to severally connect the conductors on opposite sides of the card. The power-in contacts and power-out contacts are connected through the cards. Power bus conductors are mounted on one side of the card. The conductors mounted on the side of the card with the power conductors are severally connected to the power bus conductors in widely spaced positions. The conductors are selectively interrupted at the widely spaced positions to provide coding of shorted and nonshorted conductors. Adhesive covers on the driver key card cover the conductors. A preferred drive key card has an edge and plural contacts mounted along the edge, the plural contacts include a power-in contact and a power-out contact. A power bus conductor connects the power-in contact to the power-out contact. The plural contacts further include plural data contacts, the key card apparatus further has plural conductors severally connecting the plural data contacts to the power bus and means for selectively interrupting the plural conductors.

Preferably the plural contacts are positioned on opposite sides of the edge and include power-in and power-out contacts on each side and data contacts on each side. The power-in contacts and power-out contacts are connected by connectors extending through the card. Conductors extend from the data contacts on the second side of the card and are alternately looped. Ends of the looped conductors remote from the contacts are connected through the card by connectors to respective conductors on the opposite side of the card. The drive input card thus is made reversible. The preferred receiver includes a housing with a card receiver insert in the housing and with a jack connected to the card receiver insert and housing. The power means and signal output means comprise electrical connectors extending through an opening in the housing.

DETAILED DESCRIPTION OF THE DRAWINGS

Figure 1:
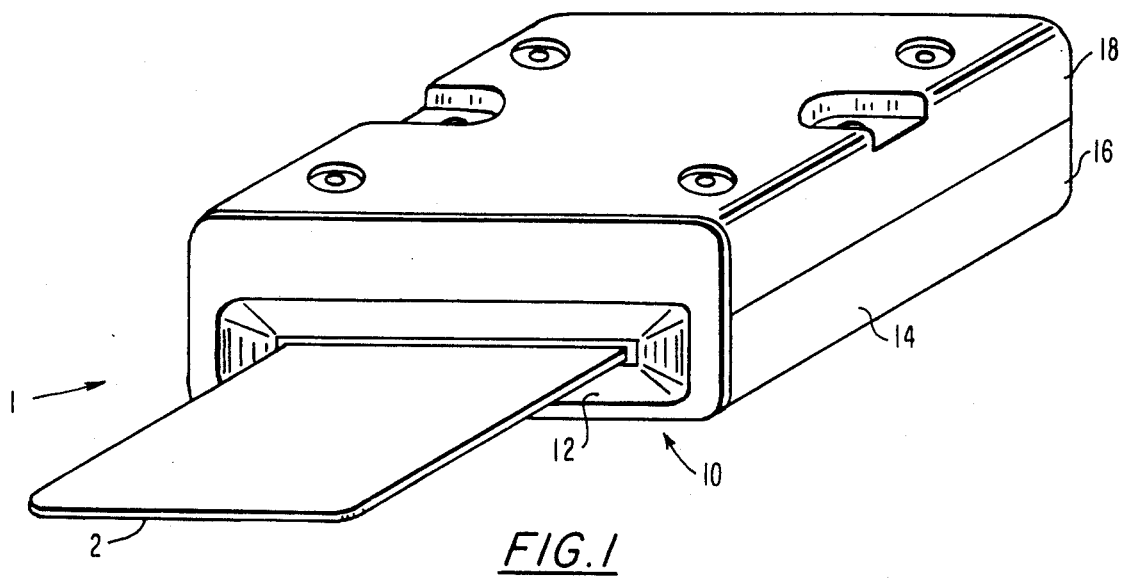
FIG. 1 is a perspective view showing the card reader and card of the present invention.

Referring to FIG. 1, a driver identification system is generally indicated by the numeral 1.

A card 2 is inserted in a receiver 10 which includes a card receiver insert 12 and a housing 14 made up of lower and upper halves 16 and 18 respectively.

Figure 2:
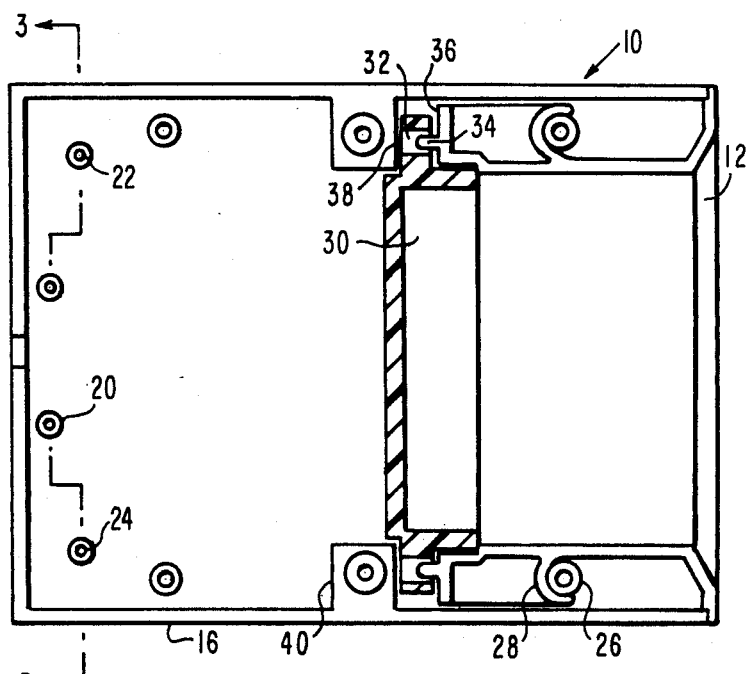
FIG. 2 is a partially assembled detail of the housing and card receiver jack.
Figure 3:
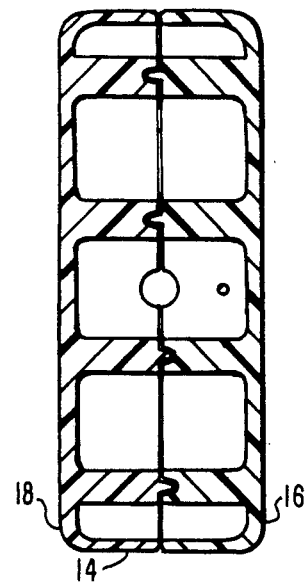
FIG. 3 is a cross-sectional detail taken along line 3—3 of FIG. 2.

As shown in FIG. 2, the lower and upper housing halves 16 and 18 are interchangeable. Housing half 16 has pedestals 20 with projections 22 and recesses 24 which complement recesses and projections on pedestals of the other housing half to hold the housing half assembled. Mounting pedestals 26 receive anchors 28 on the insert 12. A jack 30 has recesses 32 which receive projections 34 on card reader insert 12. Rear faces 36 of the insert 12 hold corners 38 of jack 30 tightly against the main mounting pedestals 40.

Figure 5:
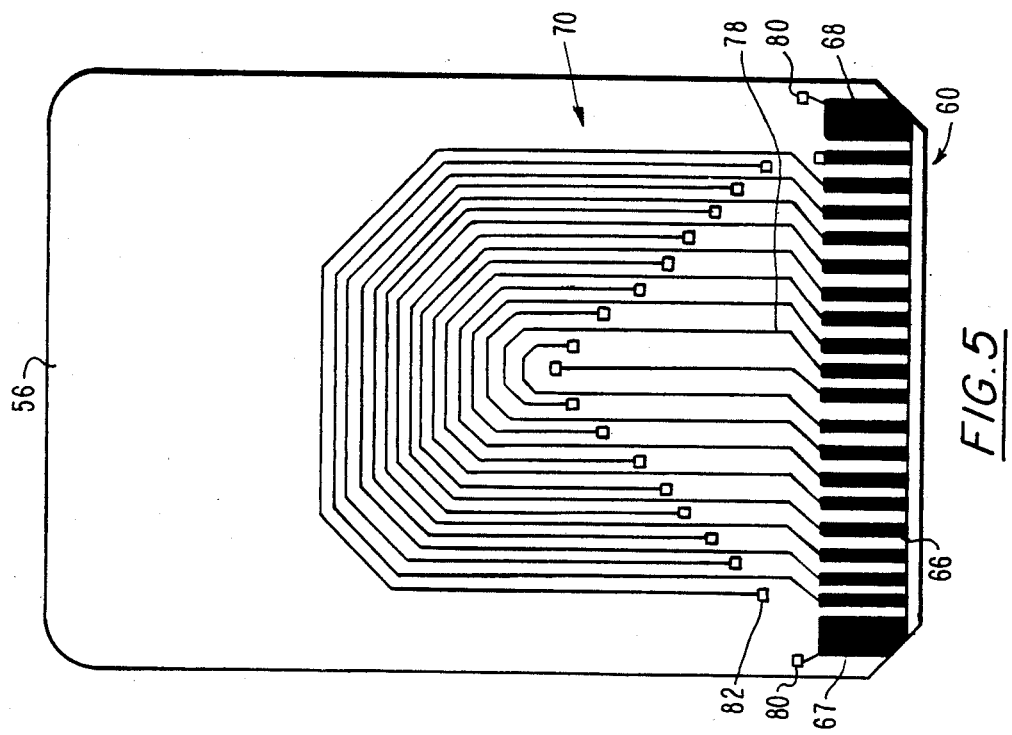
FIGS. 4 and 5 are details of opposite sides of a preferred card.
Figure 4:
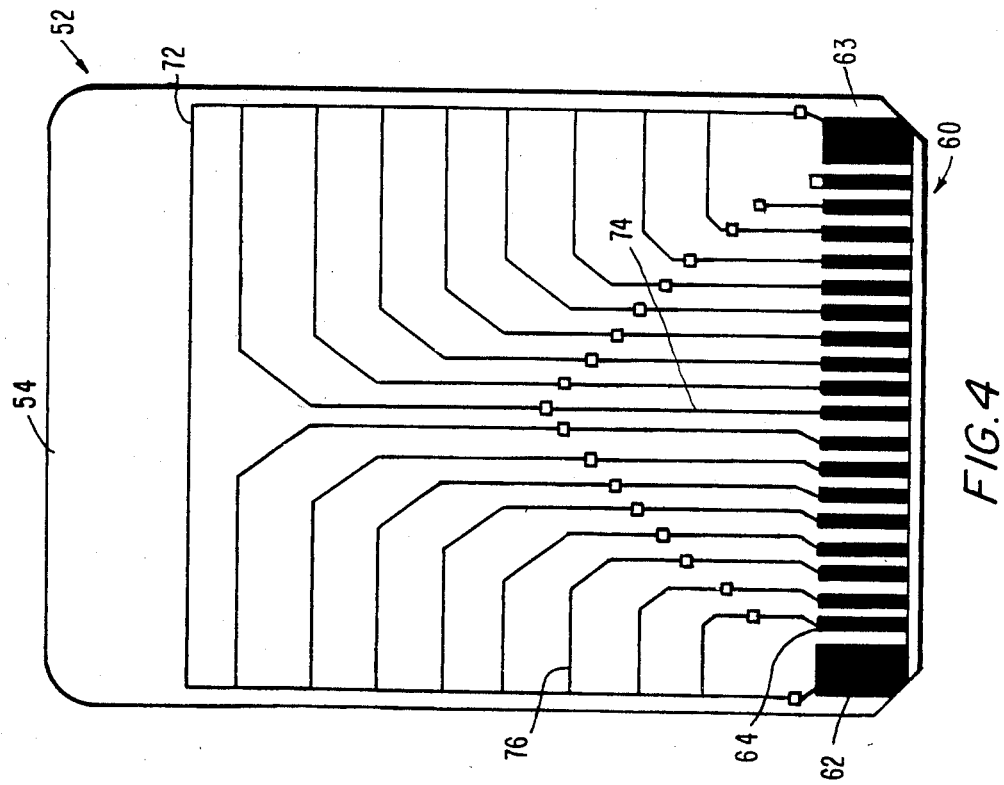
Figure 6:
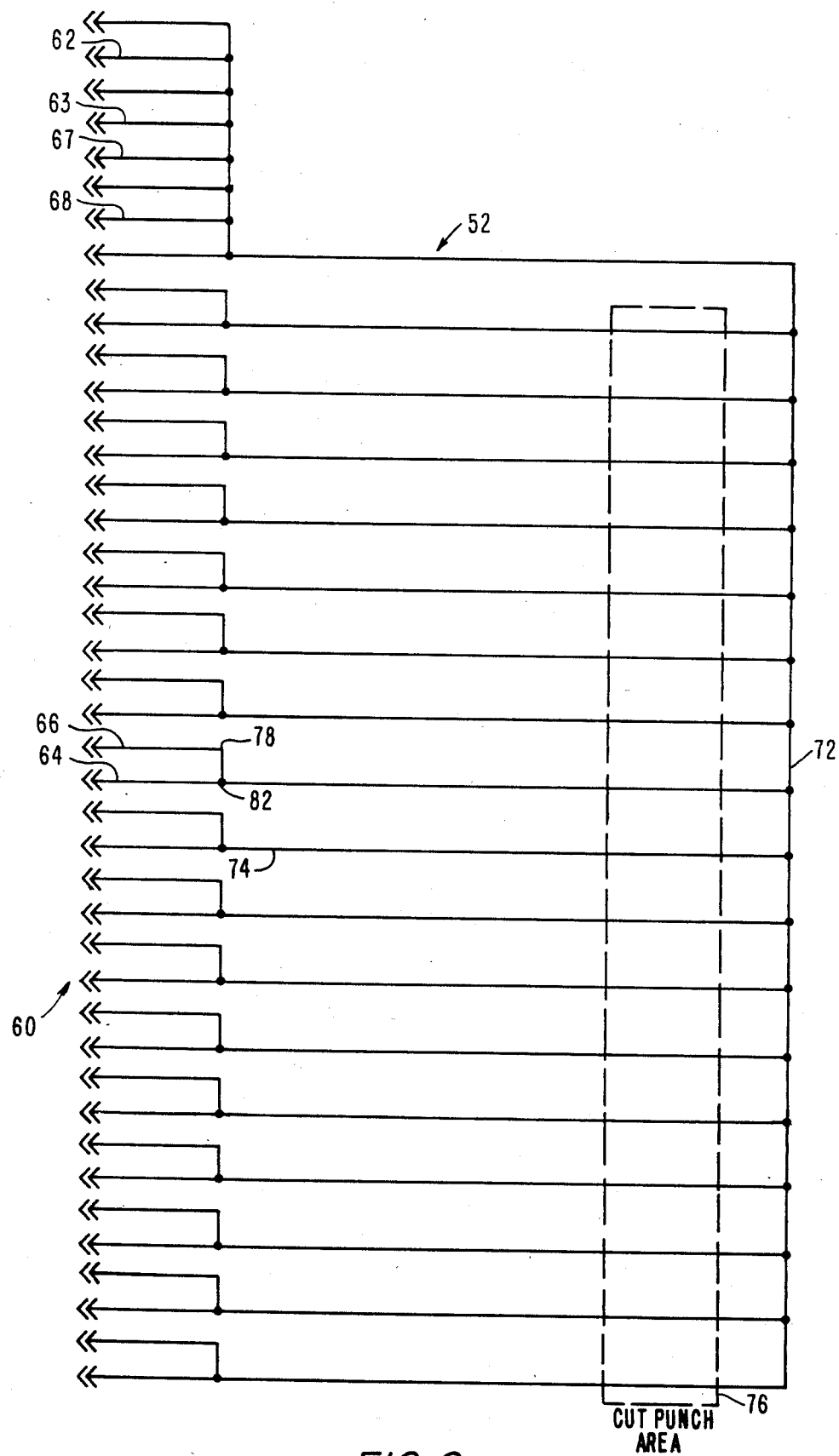
FIG. 6 is a schematic of the card and FIG. 7 is a schematic of the card reader.

Adhesive covers have been removed from the sides of the driver cards 52 as shown in FIGS. 4 and 5. Card 52 has a front side 54 and a rear side 56 on which are mounted plural contacts generally indicated by the numeral 60 and conductors generally indicated by the numeral 70.

Power-in and power-out contacts 62 and 63 on face 54 are connected together with a conductor bus 72. Data contacts 64 are severally connected to conductor bus 72 with data conductors 74 and 76. Portions 76 of the data conductors near the bus conductor 72 are widely spaced, as shown at 76, for providing areas for severing the conductors, such as by punching through the card, to provide a binary code of conductors which are shorted to the conductor bus and which are open.

So that the card may be inserted with either side up, plural data contacts 66 are provided in the opposite side of the card between power-in contact 67 and power-out contact 68.

The power-in and power-out contacts are arranged so that the power may be provided directly through the card from input to output through connectors 80. There is no distinction between the power-in and power-out contacts, as all of the contacts are shorted together.

As shown in FIG. 5, the conductors 78 are arranged in an alternatively looped fashion so that the ends of the conductors are directly opposite conductors on the opposite side 54. Connectors 82 extend through the card and connect conductors 78 with conductors 74 in reverse order so that the card may be inserted in the rear with either side up.

Figure 7:
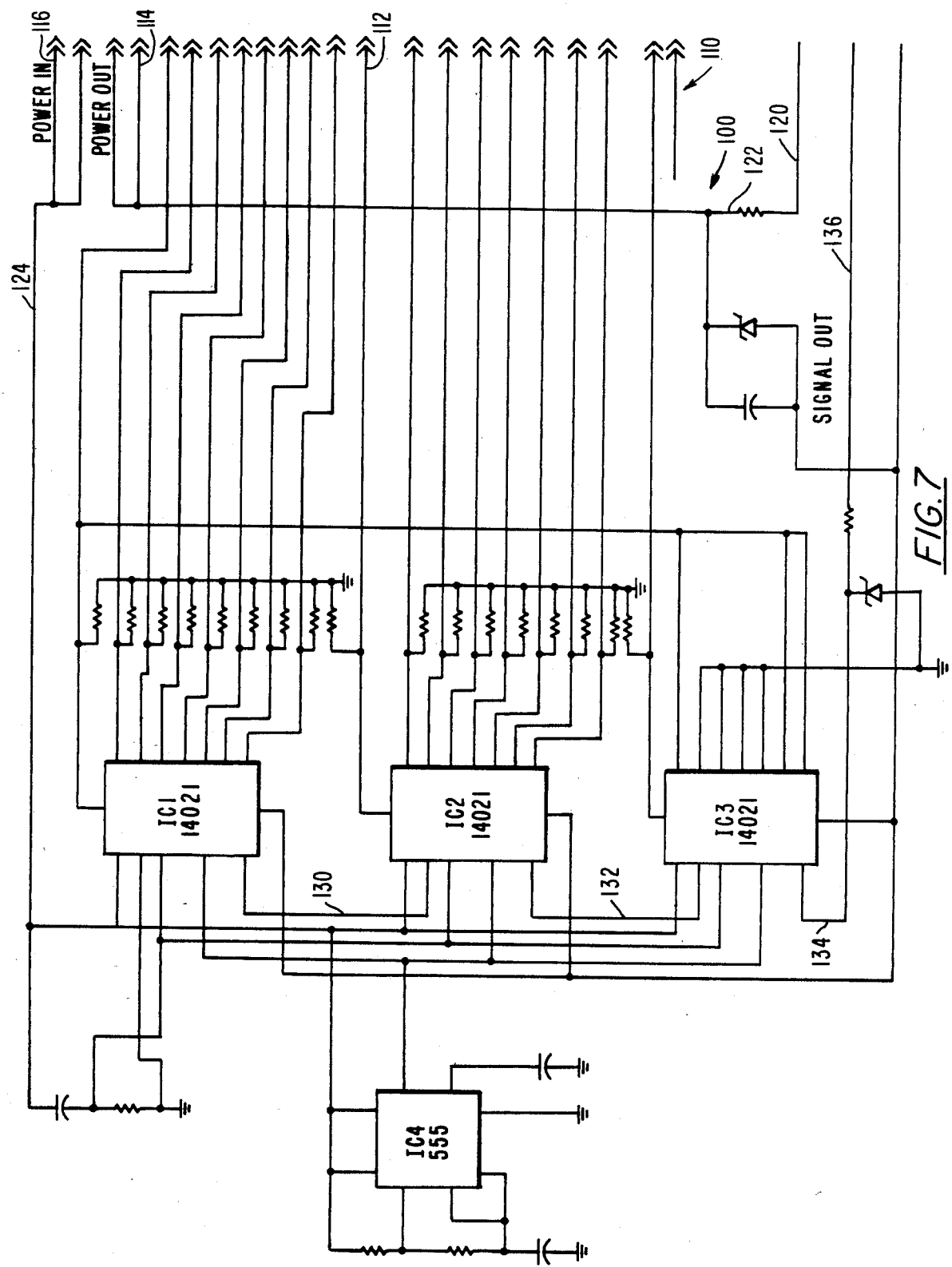

As shown in FIG. 7, the system includes a reader which is generally indicated by the numeral 100. The reader has a jack 110 with data terminals 112 and power-out terminals 114 and power-in terminals 116. A power source 120 includes a power line 122 which is connected to power-out terminals 114. Power-in terminals 116 receive the power via the card 52, as previously described, and apply the power to a power bus 124. The power bus supplies the power to three serially connected integrated circuits IC-1, IC-2 and IC-3 which convert the concurrent binary data from data terminals 112 to sequential pulses on lines 130, 132 and 134. The latter line is connected to the signal output line 136 which extends through the receiver in parallel relationship with the incoming power line 120. Power bus 124 also supplies a control integrated circuit IC-4 which pulses integrated circuits IC-1, IC-2 and IC-3 to produce the pulse train signals on signal line 136.

While the invention has been described with reference to specific embodiments, modifications and variations of the embodiments may be made without departing from the scope of the invention. The scope of the invention is defined in the following claims.

I claim:

1. A key card system comprising:
   (a) a key card receiver having a jack with plural terminals including power-out terminals, power-in terminals and data terminals;
   (b) a power source connected to the power-out terminal;
   (c) a key card having first and second sides, power-in contacts and power-out contacts located on both sides, first connection means connecting the power-in contacts with the power-out contacts including means to connect them through a body of the card, a plurality of data contacts located on opposite sides of the card, a plurality of conductors located on opposite sides of the card and connecting the power-in contacts to the data contacts, the conductors on one side of the card being alternately looped, second connection means extending through the body of the card connecting distal ends of the looped conductors to conductors on an opposite side of the card in opposite sequential order thereby enabling the cord to be inserted into the receiver with either side up;
   (d) means for interrupting selected conductors for producing a binary code of shorted and interrupted conductors on the data contacts;

(e) converting means connected to the data terminals for converting binary shorted or open data from the key card concurrently received on the data terminals to sequential data; and, (f) signal output means connected to the converting means for carrying the sequential data to a remote location.

2. A driver identification system comprising:
(a) a driver identification card receiver;
(b) means to mount the identification card receiver in a cab of a vehicle;
(c) a jack mounted in the identification card receiver having a power-in terminal, a power-out terminal and a plurality of data input terminals;
(d) a power source connected to the power-out terminal;
(e) a dielectric driver identification key card having first and second sides, power-in contacts and power-out contacts located on both sides, first connection means connecting the power-in contacts with the power-out contacts including means to connect them through a body of the card, a plurality of data contacts located on opposite sides of the card, a plurality of conductors located on opposite sides of the card and connecting the power-in contacts to the data contacts, the conductors on one side of the card being alternately looped, second connection means extending through the body of the card connecting distal ends of the looped conductors to conductors on an opposite side of the card in opposite sequential order thereby enabling the card to be inserted into the receiver with either side up;
(f) means for interrupting selected conductors for producing a binary code of shorted and interrupted conductors on the data contacts;
(g) signal converting means connected to the data terminals for converting binary shorted or open data from the driver identification key card concurrently received on the data terminals to sequential data; and,
(h) signal output means connected to the converting means for carrying the sequential data to a remote location.

3. The system of claim 1 wherein the conductors on the opposite side of the card are connected to each other and are connected to the power-in and power-out contacts.

4. The system of claim 1 wherein the conductors on the opposite side of the card are widely spaced on the card for selective interrupting.

5. The system of claim 1 wherein bus conductors extend longitudinally on the card from the power-in and power-out terminals and wherein the contacts on the opposite sides of the card are connected to the bus terminals with conductors having widely spaced portions for selective interrupting.

6. The system of claim 1 wherein the receiver includes a housing having upper and lower halves and a card receiver insert fixed in at least one half of the housing and wherein the jack is fixed internally within the housing between the insert and the housing.

7. The system of claim 1 wherein the power source comprises a power-in line mounted parallel to the signal output line.

8. The system of claim 1 further comprising a power bus mounted in the receiver and connected to the power-in terminal and wherein the converting means comprise plural integrated circuits connected to the power bus, connected to the data input terminals and connected to the signal output line.

9. The system of claim 1 wherein the plural integrated circuits are sequentially connected to each other then to the signal output line for converting concurrent binary input signals to a pulsed output train.

10. The system of claim 9 further comprising clock means connected to the power bus and connected to the plural integrated circuits for pulsing the integrated circuits to control the flow of sequential data among the integrated circuits and from the plural integrated circuits to the signal output line.

11. The system of claim 2 wherein the power-in contacts and power-out contacts are connected through the cards, and further comprising power bus conductors mounted on one side of the card, wherein the conductors mounted on the side of the card with the power bus conductors are severally connected to the power bus conductors in widely spaced positions, whereby the conductors are selectively interrupted at the widely spaced positions to provide coding of shorted and non-shorted conductors.

12. The system of claim 11 further comprising adhesive covers on the driver key card.

13. The system of claim 2, wherein the driver key card has an edge and the plurality of contacts are mounted along the edge, the plurality of contacts including data contacts, a power-in contact, a power-out contact and a power bus conductor connecting the power-in contact to the power-out contact, the driver key card further comprising plural conductors severally connecting the plural data contacts to the power bus and means for selectively interrupting the plural conductors.

14. The system of claim 13 wherein the plurality of contacts are positioned on opposite sides of the edge.

15. The system of claim 2 wherein the receiver comprises a housing; a card receiver insert mounted in the housing; and a jack connected to the card receiver insert and the housing, wherein the power means and signal output means comprise electrical connectors extending through an opening in the housing.

* * * * *